United States Patent [19]
Brown et al.

[11] Patent Number: 5,737,969
[45] Date of Patent: Apr. 14, 1998

[54] SINGLE SHAFT SHIFTING MECHANISM

[75] Inventors: Patrick L. Brown, Battle Creek; Michael J. Huggins, Kalamazoo; Joseph D. Reynolds, Climax; Daniel M. Armock, Sparta, all of Mich.

[73] Assignee: Eaton Corporation, Cleveland, Ohio

[21] Appl. No.: 636,097

[22] Filed: Apr. 22, 1996

[51] Int. Cl.⁶ .................................................. F16H 61/00
[52] U.S. Cl. ......................................... 74/477; 74/335
[58] Field of Search ........................ 74/477, 335, 473 R

[56] References Cited

U.S. PATENT DOCUMENTS

| | | | |
|---|---|---|---|
| 4,601,214 | 7/1986 | Fukuchi | 74/477 |
| 4,621,537 | 11/1986 | Piazza et al. | 74/473 |
| 4,727,765 | 3/1988 | Schneider | 74/477 |
| 4,748,863 | 6/1988 | McNinch, Jr. | 74/477 |
| 4,793,202 | 12/1988 | Okubo | 74/477 |
| 4,920,815 | 5/1990 | Reynolds | 74/335 |
| 5,000,060 | 3/1991 | Reynolds et al. | 74/745 |
| 5,025,678 | 6/1991 | Shinpo et al. | 74/477 |
| 5,036,721 | 8/1991 | Gugin | 74/477 |
| 5,193,410 | 3/1993 | Stine et al. | 74/336 |
| 5,285,694 | 2/1994 | Chene | 74/477 |
| 5,297,453 | 3/1994 | Chene | 74/477 |
| 5,390,561 | 2/1995 | Stine | 74/745 |

*Primary Examiner*—Charles A. Marmor
*Assistant Examiner*—David M. Fenstermacher
*Attorney, Agent, or Firm*—Howard D. Gordon

[57] ABSTRACT

An improved single shift shaft shifting mechanism (300) for shifting a mechanical change-gear transmission (10/110) is provided. The shifting mechanism includes a shift shaft (302) which is mounted for axial and rotational movement in a housing (H) for selectively axially moving and/or locking selected or non-selected, respectively, shift forks (302, 304, 306) relative to the housing. To provide an easily shifted, reliable and economical assembly, the shifting projections are defined by a plurality of generally annular shift pins (316, 318, 320) extending radially from bores (322, 324, 326) provided in the shift shaft (308).

23 Claims, 12 Drawing Sheets

SINGLE SHAFT SHIFTING MECHANISM

BACKGROUND OF THE INVENTION

1. Field of the Invention

The present invention relates to single shaft shifting mechanisms for change-gear transmissions or transmission sections of the type wherein a selected one of three or more selectable gear ratios are engaged and/or disengaged by the axial movement of gears or gear-engaging jaw clutch members. In particular, the present invention relates to single shaft shifting mechanisms of the type described wherein radially extending pins are utilized to provide at least one of the shifting or interlocking functions.

2. Description of the Prior Art

Single shaft shifting mechanisms for selecting and engaging or disengaging the selectable ratios of a multiple-speed vehicular mechanical transmission are known in the prior art, as may be seen by reference to U.S. Pat. Nos. 4,621,537; 4,920,815; 5,285,694 and 5,297,453, the disclosures of which are incorporated herein by reference. Such mechanisms, in certain situations, are improvements relative to the multiple parallel shift rail-type devices as disclosed in U.S. Pat. Nos. 4,445,393; 4,275,612; 4,584,895 and 4,722,237, the disclosures of which are incorporated herein by reference, as they require fewer parts, utilize a single moving shaft, making use of the improved bearings and finishes more economically feasible, require less space, allow easier control of an auxiliary transmission and/or allow easier, more economical sensing of transmission neutral and transmission in-gear conditions.

While the prior art single shaft shifting mechanisms, especially the type illustrated in aforementioned U.S. Pat. No. 4,920,815, are improvements over the prior art and commercially successful, they are not totally satisfactory, as the shifting and interlocking functions require the use of a shift key and an interlock key, each key received in a separate axially extending groove or keyway in the surface of the shift shaft. The use of such keys and keyways resulted in an elevation of the complication and expense of the shifting mechanism. The keyways or grooves run the length of the shaft, which is a long machining operation; the keyways and the depth thereof often resulted in distortion of the shaft after heat treatment, requiring additional processing and/or stress cracks in the corners of the keyways. The keys tended to be difficult and/or costly to produce and often required additional processing after heat treatment. To avoid requiring a squared-off shift pattern, the corners of the shift key radial extensions might require rounding off of the corners thereof.

SUMMARY OF THE INVENTION

In accordance with the present invention, the drawbacks of the prior art are minimized or overcome by the provision of a single shaft shifting mechanism which is easier and less expensive to produce. The foregoing is accomplished by utilizing radially extending pins, preferably generally annular pins to minimize the requirement for a squared-off shift pattern, received in radially extending bores in the shaft, shift yoke hubs and/or housing to replace one or both of the shift key and keyway or interlock key and keyway.

Accordingly, it is an object of the present invention to provide an improved single shaft shifting mechanism.

This and other objects and advantages of the present invention will become apparent from a reading of the following description of the preferred embodiment taken in connection with the attached drawings.

DESCRIPTION OF THE PREFERRED EMBODIMENT

Figure 1:
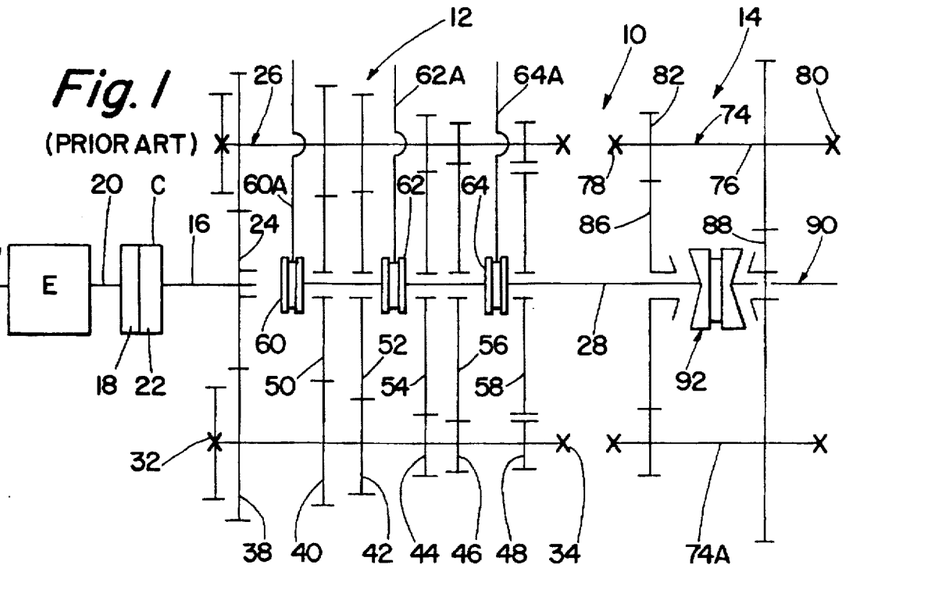
FIG. 1 is a schematic illustration of a compound transmission having a range-type auxiliary section.

Certain terminology will be used in the following description for convenience in reference only and will not be limiting. The words "upwardly," "downwardly," "rightwardly" and "leftwardly" will designate directions in the drawings to which reference is made. The words "forward" and "rearward" will refer to the front and rear ends, respectively, of the transmission as conventionally mounted in a vehicle, being respectively from the left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change-speed or change-gear transmission having a multiple-forward-speed main transmission section and a multiple-speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to non-rotatably couple a selected gear to a shaft by means of a positive clutch in which attempted engagement of said clutch is prevented until the members of the clutch are at substantially synchronous rotation in a relatively large-capacity friction means are utilized with the clutch members and are sufficient, upon initiation of a clutch engagement, to cause the clutch members and all members rotating therewith to rotate at substantially synchronous speed.

The term transmission as used herein shall refer to either a simple transmission or to the main transmission section of a compound transmission.

Figure 1A:
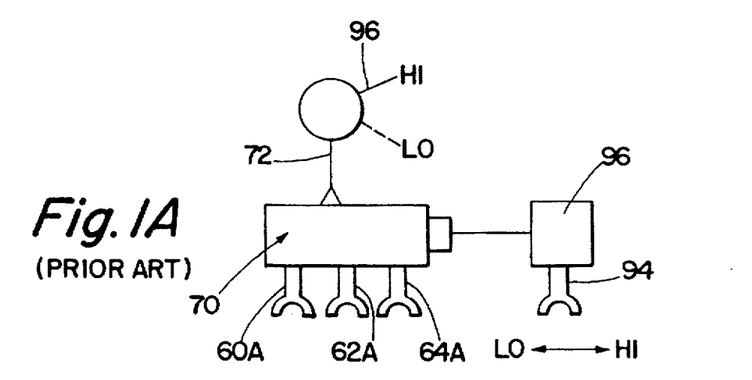
FIG. 1A is schematic illustration of the shifting mechanism of the transmission of FIG. 1.
Figure 1B:
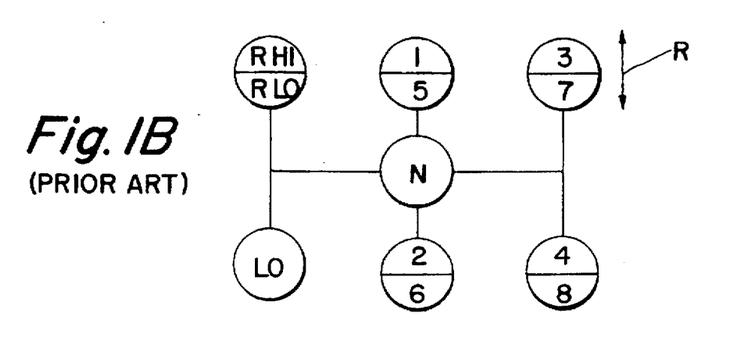
FIG. 1B is a schematic illustration of the shift pattern of the transmission of FIG. 1.

Referring to FIGS. 1, 1A and 1B, a prior art range-type compound transmission 10 with which the shifting mechanism of the present invention is advantageously utilized, is illustrated. Compound transmission 10 comprises a multiple-speed main transmission section 12 in series with a range-type auxiliary section 14. Transmission 10 is housed within a housing H and includes an input shaft 16 driven by a prime mover, such as diesel engine E, through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28, which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64, as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks (also called shift yokes) 60A, 62A and 64A, respectively, associated with the shift housing assembly 70, as well known in the prior art. Clutch collars 60, 62 and 64 may be of the well known acting synchronized or non-synchronized double acting jaw clutch type.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, non-engaged position as illustrated, or in a fully rightwardly engaged or fully leftwardly engaged position by means of a shift lever 72. As is well known, only one of the clutches 60, 62 and 64 is engageable at a given time and main section interlock means are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of shift fork 94 and the range section shifting actuator assembly 96, is provided for clutching either gear 86 to mainshaft 28 for low range operation or gear 88 to mainshaft 28 for direct or high range operation of the compound transmission 10. The shift pattern for compound range type transmission 10 is schematically illustrated in FIG. 1B. Selection of low or high range operation of the transmission 10 is by means of an operator actuated switch or button 98 which is usually located at the shift lever 72. Alternatively a "double-H" type shifting device may be utilized.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, as indicated above, any one or more of clutches 60, 62 or 64 may be of the synchronized jaw clutch type and transmission sections 12 and/or 14 may be of the single countershaft type.

Transmissions of this general type are well known in the prior art and may be appreciated in greater detail by reference to U.S. Pat. Nos. 4,754,665; 5,193,410 and 5,390,561, the disclosures of which are incorporated herein by reference.

Figure 2:
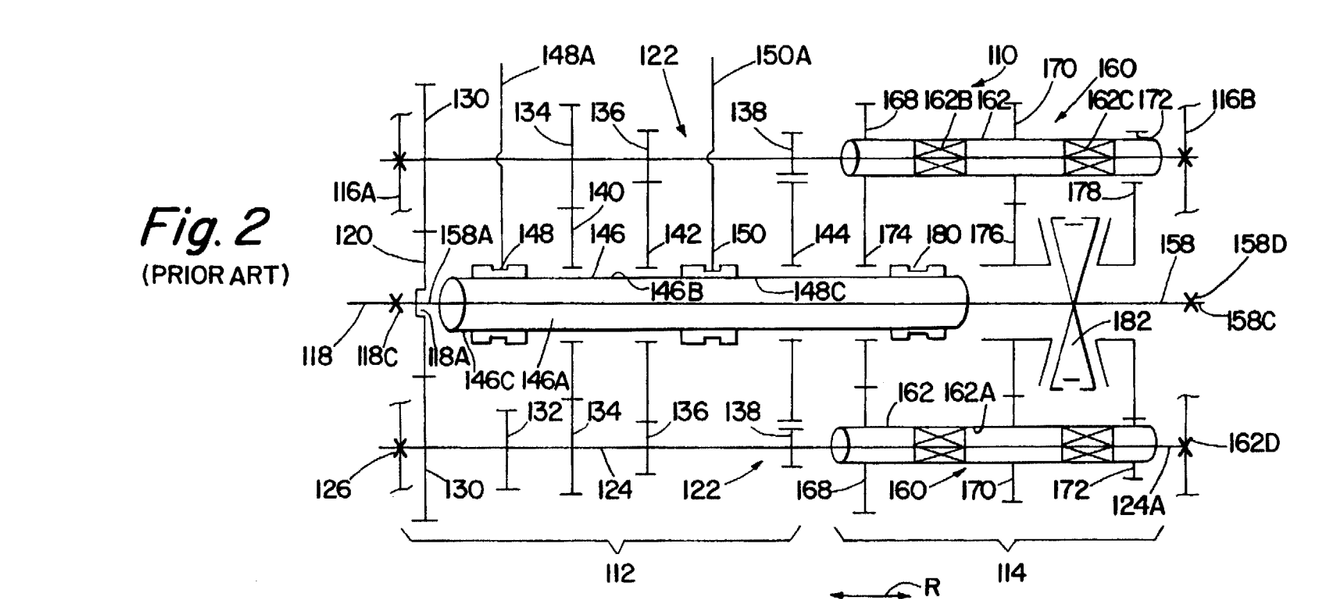
FIG. 2 is a schematic illustration of a compound transmission of the automatic range-shift type.
Figure 2A:
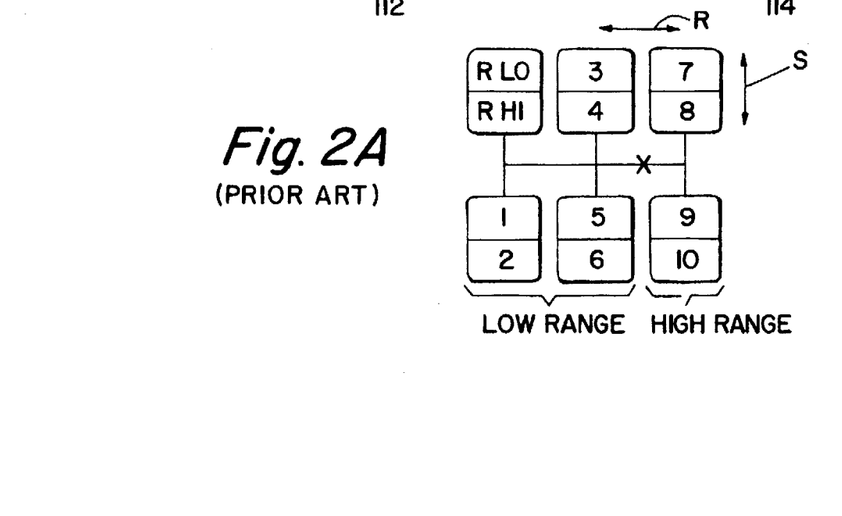
FIG. 2A is a schematic illustration of the shift pattern and typical ratio steps for the transmission of FIG. 2.

FIGS. 2 and 2A illustrate a "(2+1)×(2)×(2)" 10-speed transmission 110 of the automatic range shift type, which also may advantageously utilize the shifting mechanism of the present invention. Transmissions of this general type are well known in the prior art, sold under the trademark "Super 10" by the assignee of this invention, Eaton Corporation, and illustrated in greater detail in U.S. Pat. No. 5,000,060, the disclosure of which is incorporated herein by reference.

Transmission 110 includes a mainsection 112 and an auxiliary section 114, both contained within housing 116.

Housing 116 includes a forward end wall 116A and a rearward end wall 116B, but not an intermediate wall.

Figures 3, 3A:
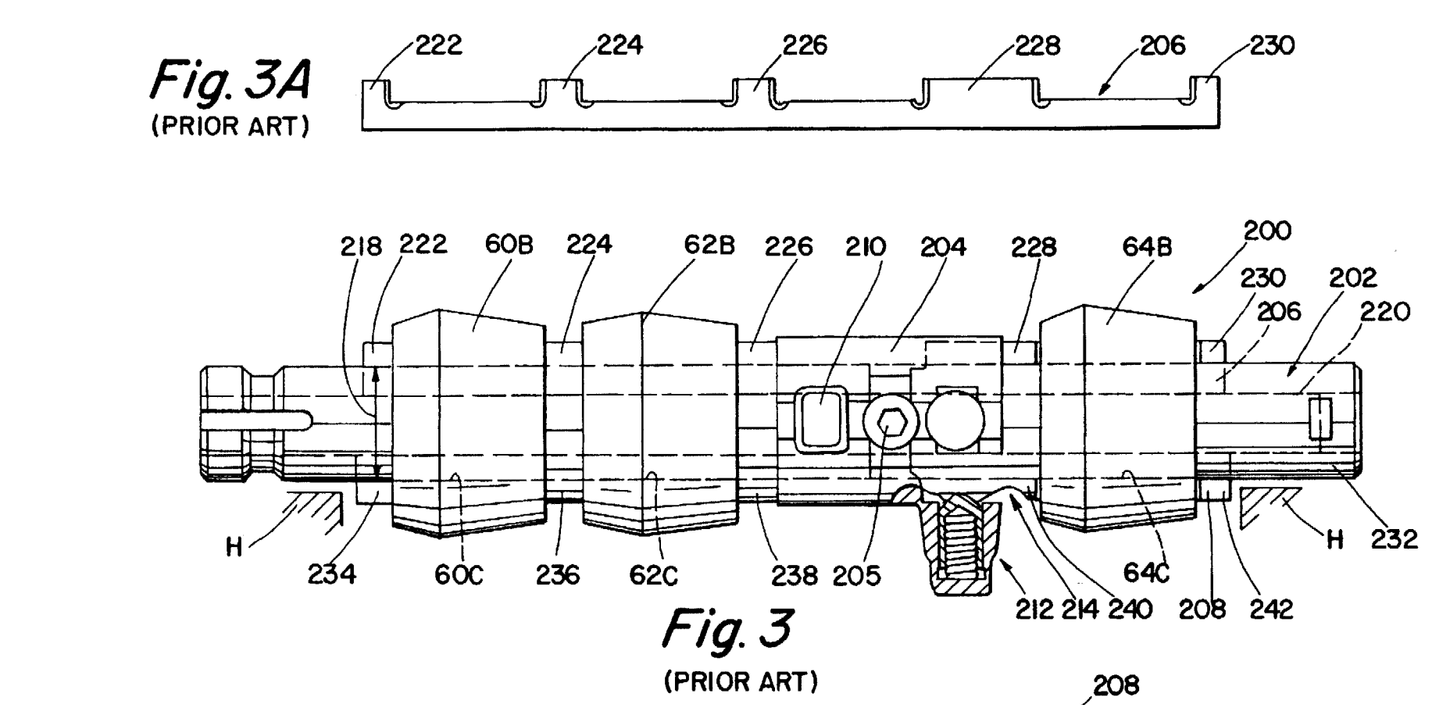
FIG. 3 is a top view of the prior art single shift shaft and shift yoke assembly.
FIGS. 3A and 3B are top views of the shift key and interlock key, respectively, used in the prior art assembly of FIG. 3.

Input shaft 118 carries input gear 120 fixed for rotation therewith and defines a rearwardly opening pocket 118A wherein a reduced diameter extension 158A of output shaft 158 is piloted. A non-friction bushing 118B or the like may be provided in pocket or blind bore 118A. The forward end of input shaft 118 is supported by bearing 118C in front end wall 116A while the rearward end 158C of output shaft 158 is supported by bearing assembly 158D in rear end wall 116B. Bearing assembly 158D may be a pair of opposed taper bearings or a single roller or ball bearing as is illustrated in FIG. 3.

The mainshaft 146, which carries mainshaft clutches 148 and 150, and the mainshaft splitter clutch 180 is in the form of a generally tubular body 146A having an externally splined outer surface 146B and an axially extending through bore 146C for passage of output shaft 158. Shift forks 152 and 154 are provided for shifting clutches 148 and 150, respectively. Mainshaft 146 is independently rotatable relative to input shaft 118 and output shaft 158 and preferably is free for limited radial movements relative thereto.

The mainsection 112 includes two substantially identical mainsection countershaft assemblies 122, each comprising a mainsection countershaft 124 carrying countershaft gears 130, 132, 134, 136 and 138 fixed thereto. Gear pairs 130, 134, 136 and 138 are constantly meshed with input gear 118, mainshaft gears 140 and 142 and idler 157, which is meshed with reverse mainshaft gear 144.

Mainsection countershaft 124 extends rearwardly into the auxiliary section where its rearward end 124A is supported directly or indirectly in rear housing end wall 116B.

The auxiliary section 114 includes two substantially identical auxiliary countershaft assemblies 160 each including an auxiliary countershaft 162 carrying auxiliary countershaft gears 168, 170 and 172 for rotation therewith. Auxiliary countershaft gear pairs 168, 170 and 172 are constantly meshed with splitter gear 174, splitter/range gear 176 and range gear 178, respectively. Splitter clutch 180 is fixed to mainshaft 146 for selectively clutching either gear 174 or 176 thereto while synchronized range clutch 182 is fixed to output shaft 158 for selectively clutching either gear 176 or gear 178 thereto.

Auxiliary countershafts 162 are generally tubular in shape defining a through bore 162A for receipt of the rearward extensions of the mainsection countershafts 124. Bearings or bushings 162B and 162C are provided to rotatably support auxiliary countershaft 162 on mainsection countershaft 124. Bearing 162D directly or indirectly supports the rear ends of countershafts 124 and 162 in the rear end wall 116B.

As may be seen by reference to FIGS. 2 and 2A, by selectively axially positioning both the splitter clutch 180 and the range clutch 182 in the forward and rearward axial positions thereof, four distinct ratios of mainshaft rotation to output shaft rotation may be provided. Accordingly, auxiliary transmission section 114 is a 3-layer auxiliary section of the combined range and splitter type providing four selectable speeds or drive ratios between the input (mainshaft 146) and output (output shaft 158) thereof. The mainsection 112 provides a reverse and three potentially selectable forward speeds. However, one of the selectable mainsection forward gear ratios, the low speed gear ratio associated with mainshaft gear 142, is not utilized in the high range. Thus, transmission 110 is properly designated as a "(2+1)×(2×2)" type transmission providing nine or ten selectable forward speeds, depending upon the desirability and practicality of splitting the low gear ratio.

The shift pattern for shifting transmission 110 is schematically illustrated in FIG. 2B. Divisions in the vertical direction at each gear lever position signify splitter shifts, while movement in the horizontal direction from the 3/4 and 5/6 leg of the H pattern to the 7/8 and 9/10 leg of the H pattern signifies a shift from the low range to the high range of the transmission. As discussed above, splitter shifting is accomplished in the usual manner by means of a vehicle operator-actuated splitter button or the like, usually a button located at the shift lever knob, while operation of the range clutch shifting assembly is an automatic response to movement of the gear shift lever between the central and rightwardmost legs of the shift pattern, as illustrated in FIG. 2 and which will be described in greater detail below. Range shift devices of this general type are known in the prior art and may be seen by reference to U.S. Pat. Nos. 3,429,202; 4,455,883; 4,561,325 and 4,663,725, the disclosures of which are incorporated herein by reference.

As will be discussed in greater detail below, due to the automatic range-type shift pattern for transmission 110, two independent positions, one in low range (3/4 and 5/6) and one in high range (7/8 and 9/10), must be provided for selecting and engaging and disengaging the ratios associated with clutch 148.

Figure 3B:
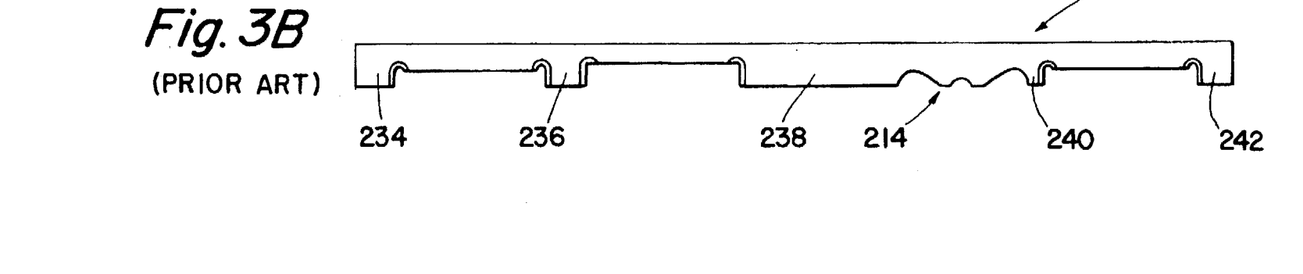

FIGS. 3, 3A and 3B illustrate a prior art single shift shaft and hub assembly 200. Assembly 200 includes a shift shaft 202 axially slidable and rotatable in housing H, hubs 60B, 62B and 64B of shift yokes 60A, 62A and 64A, respectively, a shift block member 204, a shift or selector key 206, and an interlock key 208. The shift block 204 is fixed for axial and rotational movement with shaft 202 as by a set screw 205 and defines a socket 210 for receiving a shift actuator, such as a shift lever (see FIG. 4), and a spring-biased detent subassembly 212 for interacting with detent notches 214 provided on the interlock key 208.

Each of the hubs is provided with a through bore 60C, 62C and 64C, respectively, of a diameter 216 slightly greater than the outer diameter 218 of shaft 202. The shift key 206 is carried in a keyway 220 in shaft 202 for axial movement with the shaft 202. The shift key is axially and rotatably movable with shaft 202 relative to housing H and defines a plurality of radially outwardly extending shift or selector teeth 222, 224, 226, 228 and 230. The interlock key 208 is received in an axially extending keyway 232 in shaft 202 for rotational movement with and axial movement relative to shaft 202. The ends of interlock key 208 axially abut portions of housing H whereby the interlock key is axially fixed in housing H. Interlock key 208 defines a plurality of radially outwardly extending interlock teeth 234, 236, 238, 240 and 242, similar to the shift teeth defined by shift key 208.

The structure and operation of single shaft shift assembly 200 may be appreciated in greater detail by reference to aforementioned U.S. Pat. No. 4,920,815. With the transmission in neutral, each of the hubs is located between a set of shift key teeth and a set of interlock key teeth. Each of the hub portions 60B, 62B and 64B of the shift forks 60A, 62A, and 64A, respectively, is provided with a plurality of grooves extending radially outwardly from the inner diameter bore surfaces thereof and extending axially through the entire axial extent of each of the hub portions. Each of the grooves is of a dimension such that, when circumferentially aligned with one of the shifting or interlock keys, the aligned key may be received within the groove, allowing relative axial movement between the hub and the aligned tooth.

Figure 3C:
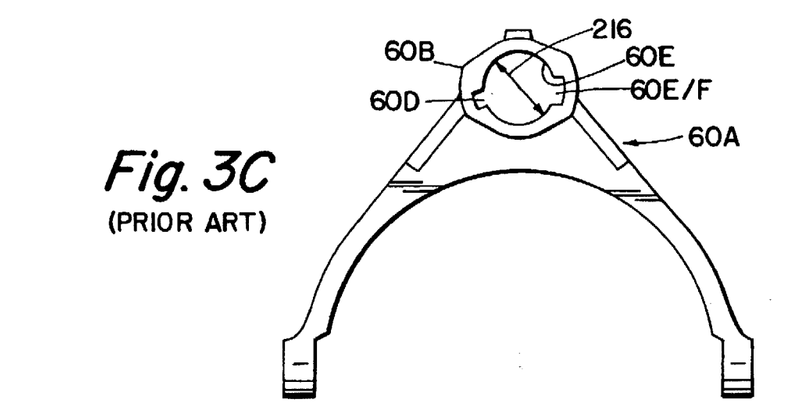
FIG. 3C is a front view of a shift yoke hub portion utilized in the prior art assembly of FIG. 3.
Figure 4:
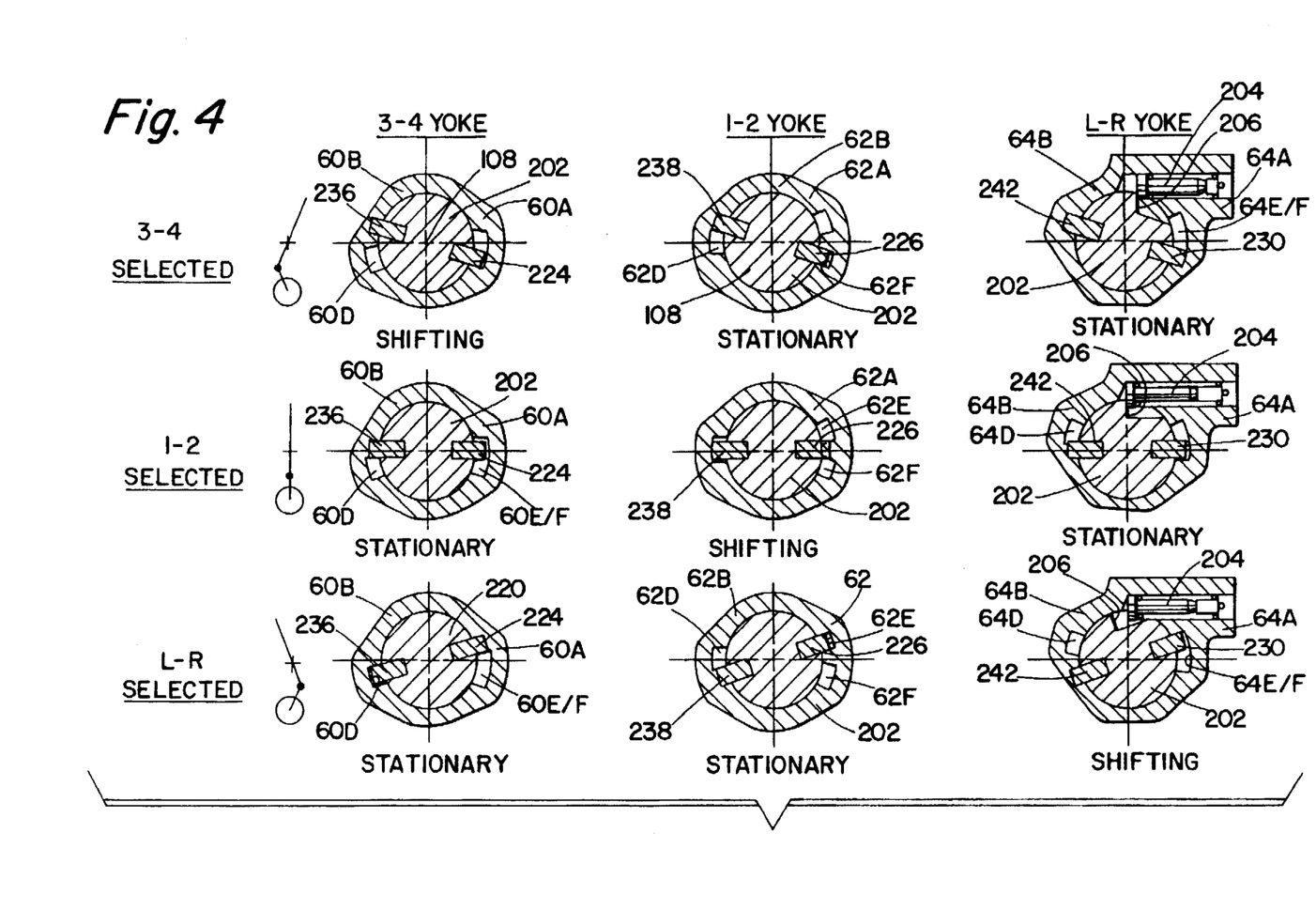
FIG. 4 is a matrix showing the positions of the shaft and keys of the prior art assembly of FIG. 3 for each selection position thereof.

As may be seen by FIG. 3C and FIG. 4, hub portion 60B of shift fork 60A is provided with a groove 60D and a double-width groove 60E/F. Hub portion 62B of shift fork 62A is provided with grooves 62D, 62E and 62F. Hub portion 64B of shift fork 64A is provided with groove 64D and a double-width groove 64E/F.

Axial displacement and rotation of shaft 106 relative to housing H are controlled by a remote or direct shifting actuator acting on the socket connector of block member 204, which is axially and rotationally fixed to the shaft 202.

The grooves in the various hub portions of the various shift fork members are arranged such that, for each of the three selection positions of the shifting mechanism, the grooves of all the hub portions (except that hub portion to be axially moved) are in circumferential misalignment with the interlock teeth, while one of the grooves in the hub portion of the shift fork to be axially moved is aligned with the interlock teeth, allowing that shift fork to be axially moved relative to the housing. Further, at least one groove in the hub portions of all the shift forks (except that shift fork to be axially moved) is aligned with the shifting teeth, allowing the shaft 202 to be axially moved relative to those shift forks, while none of the grooves on the hub portion of the shift fork to be axially moved is aligned with the shifting teeth, whereby that shift fork will be axially engaged by the shift teeth on both axial sides thereof for axial movement with the shift shaft 106.

The interaction of the various teeth and grooves may be seen by reference to FIG. 4. FIG. 4 defines a 3×3 matrix showing the relative positions of the interlock teeth, shifting teeth and grooves of the hub portion for various operating conditions of the shifting mechanism. The right column illustrates hub portion 64B for various rotational positions of shift shaft. The middle column illustrates hub portion 62B for various rotational positions of shift shaft, and the left column illustrates hub portion 60B for the various rotational positions of shift shaft. The top row illustrates the position of the shift shaft in the selection position for engaging and disengaging either the reverse or low speed gear ratios. The middle row illustrates the position of shift shaft for engaging or disengaging either the first or second speed gear ratios. The bottom row illustrates the position of shift shaft relative to the various hub portions of the shift shaft in the shift shaft position for engaging or disengaging either third or fourth speed gear ratios. The various views shown in FIG. 4 (and in FIGS. 6, 11 and 12) are sectional views taken from the rear of the transmission or shifting mechanism.

By way of example, assuming the operator has rotationally positioned shaft 202 for selection of engagement or disengagement of either first or second speed gear ratios, the shaft 202 will be rotationally positioned as illustrated in the second column. In this position, the interlock teeth 240 and 242 will not be in alignment with groove 64D of the hub portion 64B and, thus, the shift fork 64A will be axially locked relative to the housing H. Similarly, interlock teeth 234 and 236 will not be in alignment with groove 60D, and the shift fork 60A will be axially locked relative to housing H. Interlock teeth 238 and 240 will be axially aligned with groove 62D of hub portion 60B of shift fork 62A, allowing shift fork 62A and the clutch member 62 to be axially moved relative to the housing H for engagement or disengagement of either gear 52 or 54 to main shaft 28. Shifting teeth 228 will align with groove 64E/F in hub portion 64B and shifting teeth 222 and 224 will align with groove 60E/F in hub portion 60B, allowing the shaft 202 to be axially moved relative to the shift forks 60A and 64A which are now held axially fixed relative to the housing by action of the interlock teeth. Shifting teeth 224 and 226 will not align with either groove 62E or 62F in hub portion 62B of shift fork 62A, thereby fixing the shift fork 62A for axial movement with the shaft 106.

While the single shaft shifting mechanism of the prior art is illustrated in connection with a five-forward-speed, one-reverse-speed main transmission section 12, such mechanisms, and the single shaft shifting mechanism of the present invention, also could be utilized with transmissions having a greater number of selectable ratios by the provision of additional shift fork and hub assemblies and proper positioning of the groove in each of the hub assemblies. As will be described in greater detail below, such mechanisms also may be utilized with transmissions, such as transmission 110, having an automatic range shifting feature.

A preferred embodiment of the single shift shaft and shift yoke hub assembly 300 of the present invention, functionally substantially identical to the assembly 200 illustrated in FIG. 3, may be seen by reference to FIGS. 5, 5A, 5B, 5C, 6 and 9A.

Figure 5:
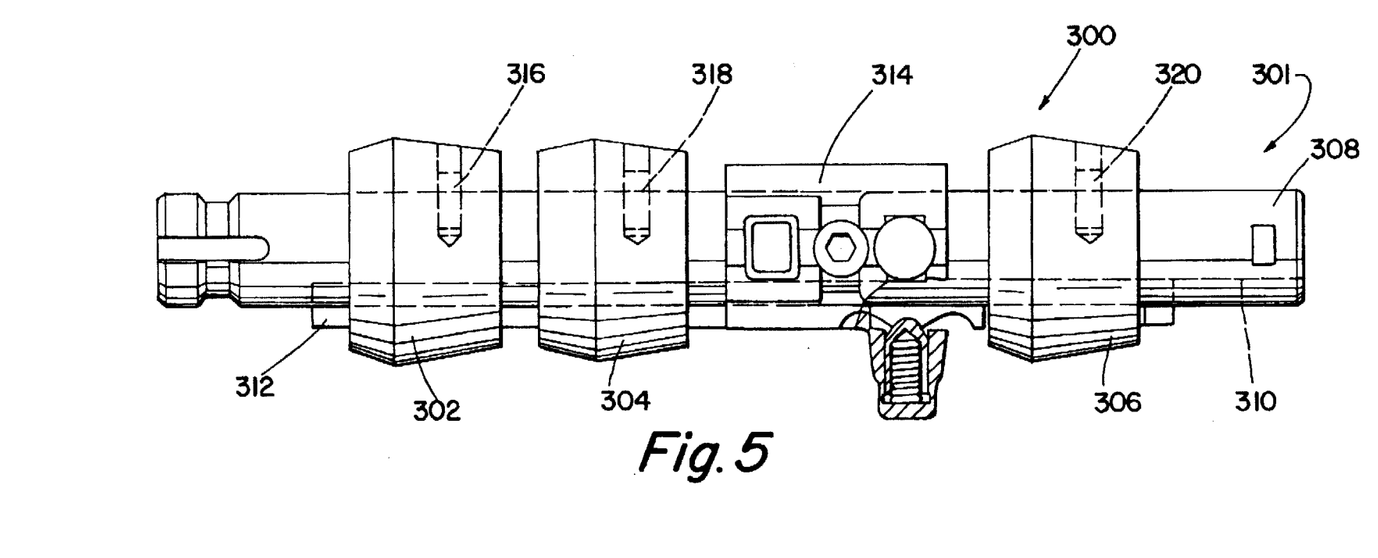
FIG. 5 is a top view of a preferred embodiment of the single shift shaft shifting mechanism of the present invention.

The shift shaft and yoke assembly 300 includes a shift shaft assembly 301 and three shift yoke hubs 302, 304 and 306 corresponding to the shift yoke hubs 60B, 62B and 64B, respectively, for controlling the axial positioning of clutches 60, 62 and 64, respectively.

The shift shaft assembly 302 has a shaft 308 with a keyway 310 for receiving an interlock key 312 substantially structurally and functionally identical to the keyway 232 and interlock key 214 described above. A shift block member 314, substantially structurally and functionally identical to shift block member 204, is fixed to shaft 308.

Shaft assembly 302 differs from the comparable assembly of embodiment 200 in that a shift key 206 and a shift key keyway 220 are not utilized and three shift pins, 316, 318 and 320, fixed to and radially extending from the shaft 308, provide the shift selection function.

Figure 5A:
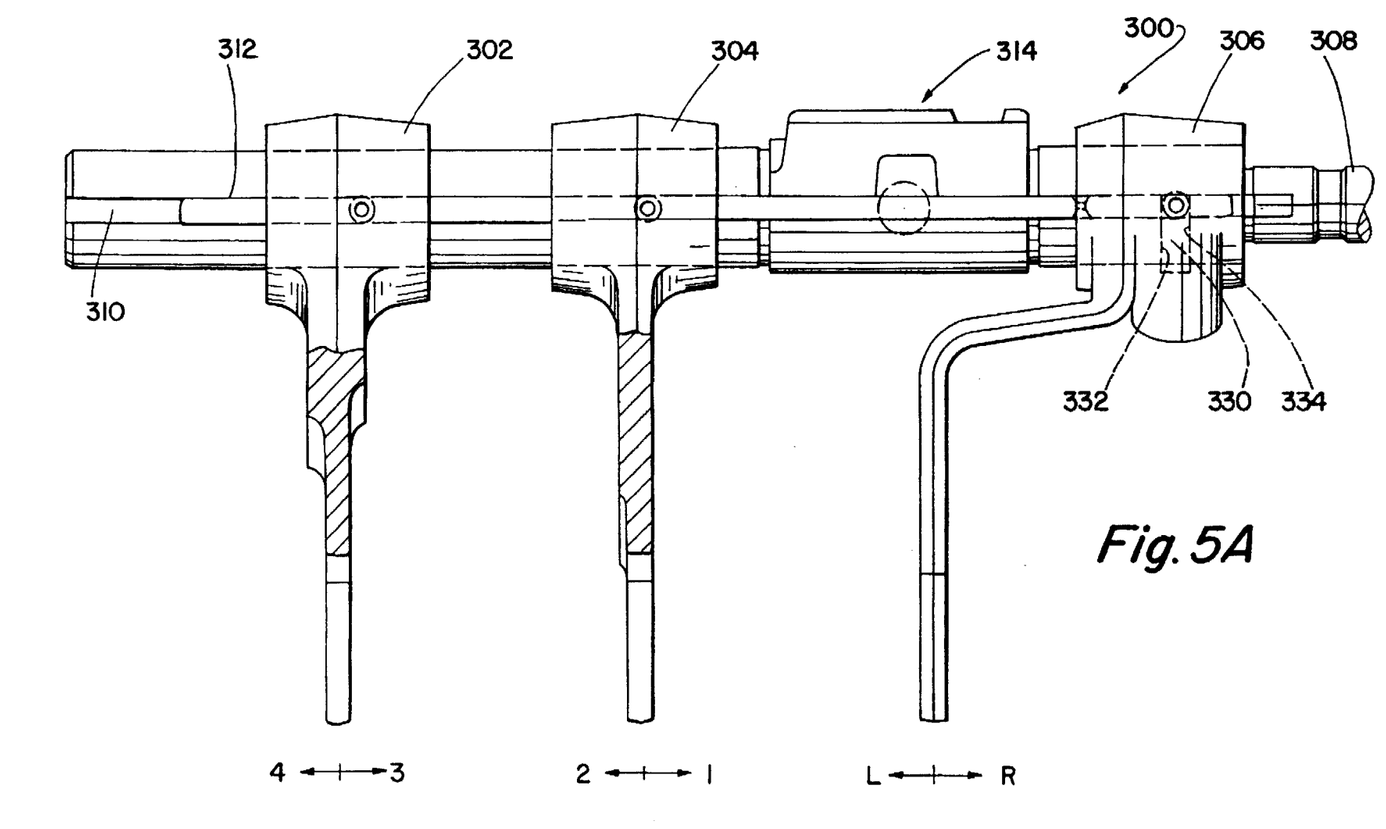
FIG. 5A is a side view of the shifting mechanism of FIG. 5.
Figure 5B:
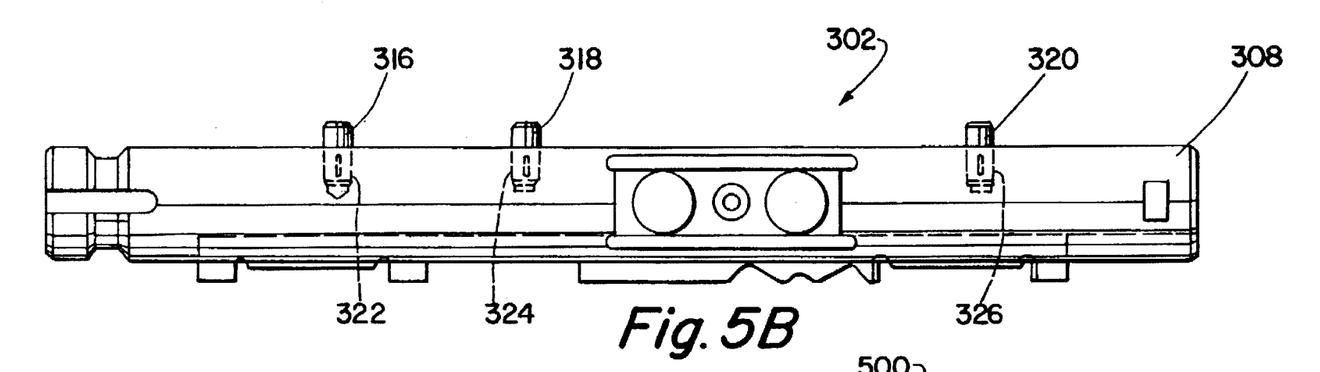
FIG. 5B is a top view of the shaft assembly of the mechanism of FIG. 5.

In the embodiment of FIGS. 5, 5A and 5B, the shift pins (see FIG. 5C), which may be "D" or "H" shaped, are pressed into radially extending blind bores 322, 324 and 326 provided in the surface of the shaft 308.

Figure 9A:
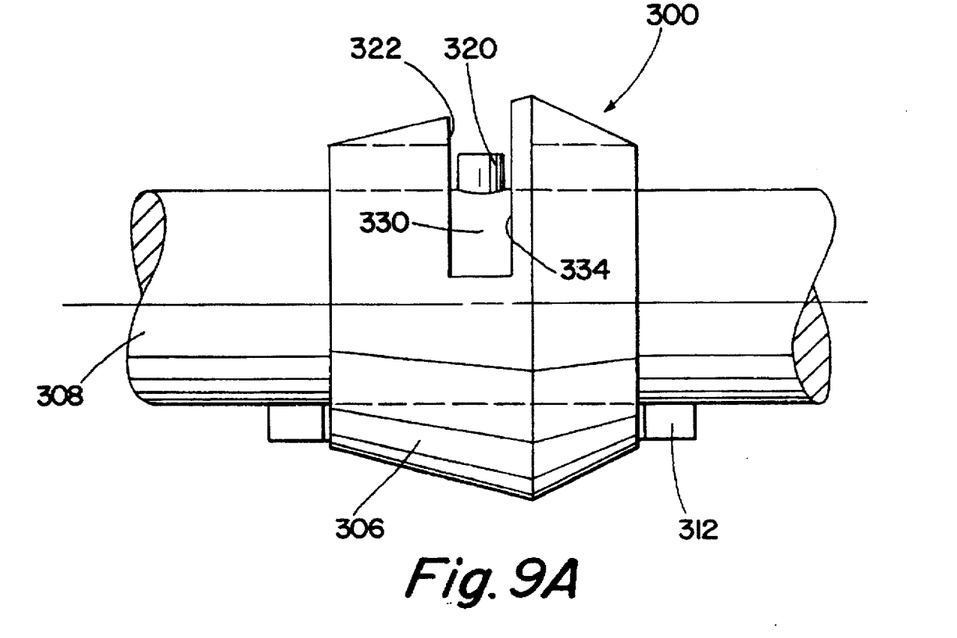
FIGS. 9A and 9B are illustrations of alternate hub constructions for the preferred embodiment of FIGS. 5 through 8.

Referring to FIG. 9A, it may be seen that shift yoke hub 306 differs from hub 64B in that a transversely extending slot 330 is provided for receiving shift pin 320, allowing the pin 320 and shaft 308 to rotate relative to hub 306 and defining opposed strike surfaces 332 and 334 for engagement by the pin 320 when the pin is not aligned with an axially extending groove corresponding to grooves 64E/64F.

Figure 9B:
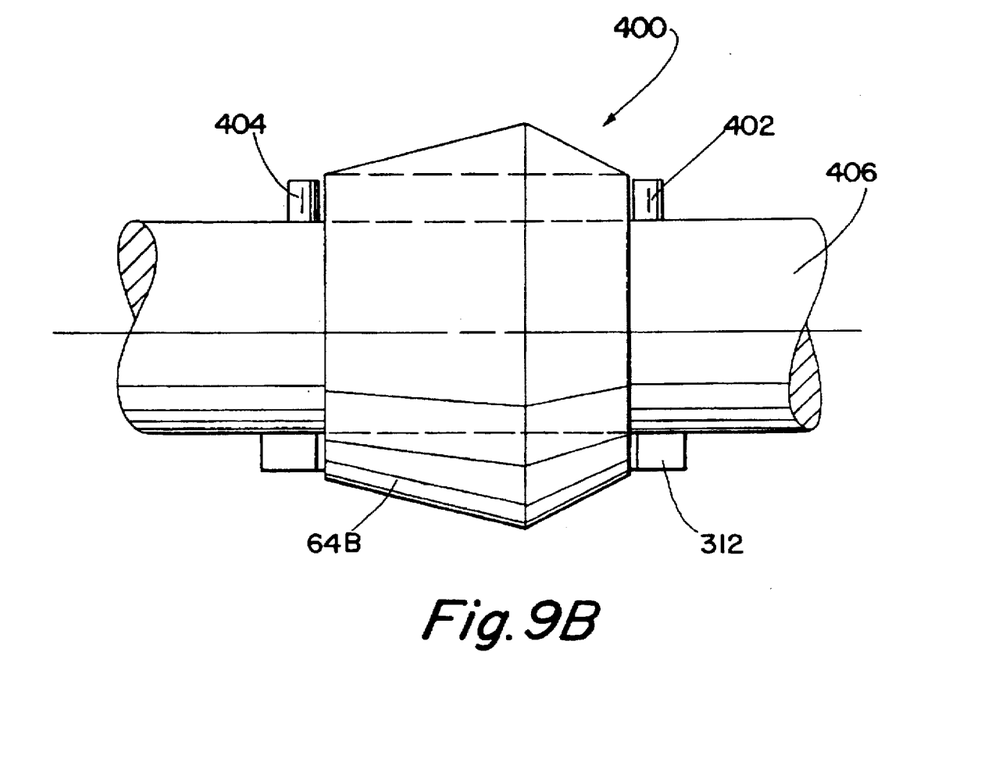

FIG. 9B illustrates a modified embodiment 400 of the hub and shaft assembly of the present invention. In this embodiment, hub 64B may be utilized without a slot corresponding to slot 330, but a pair of shift pins 402 and 404 extending radially from shaft 406 and axially surrounding the hub 64B are required in place of a single shift pin. In embodiment 400, pins 402 and 404 correspond to teeth 228 and 230 of shift key 206.

Figure 6:
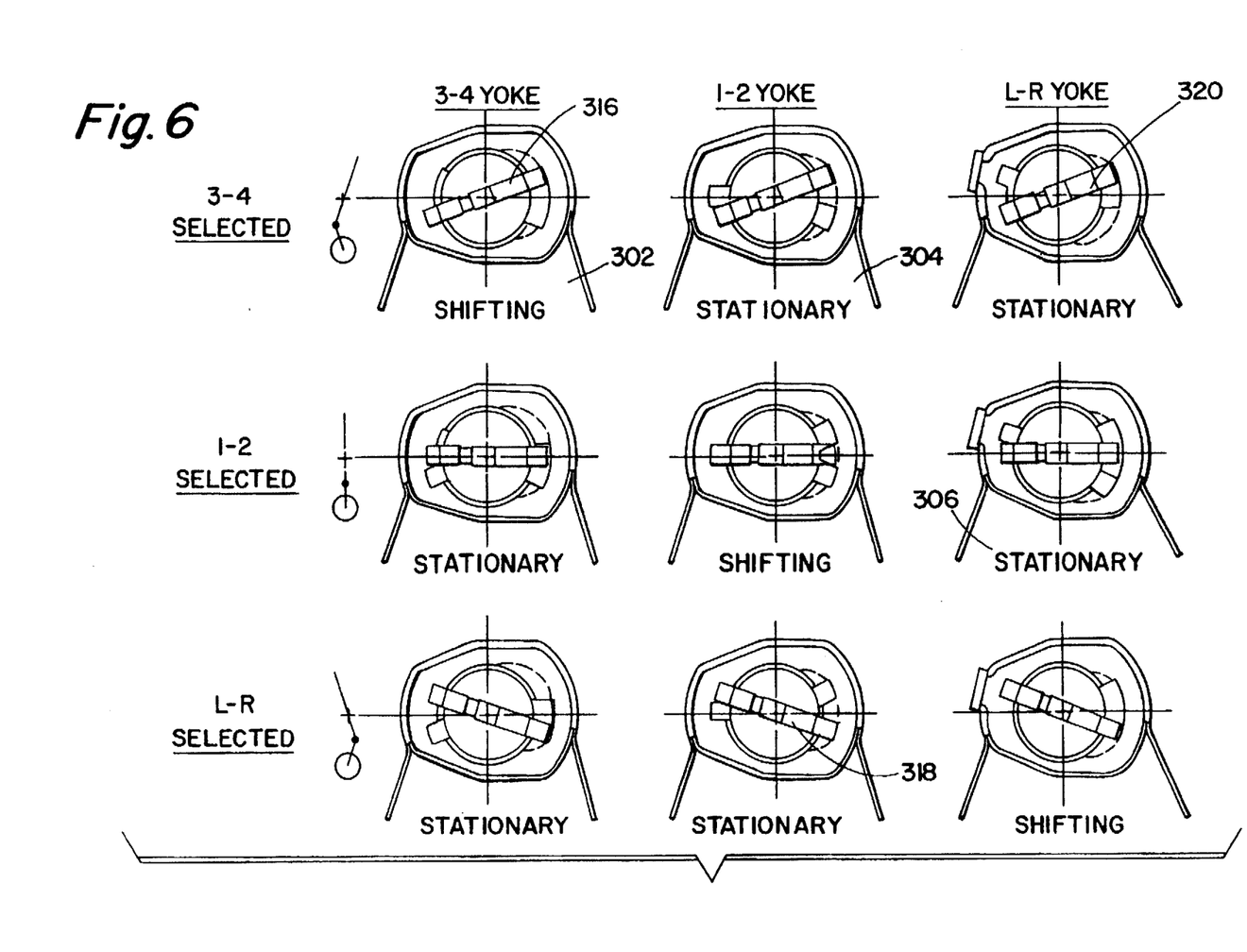
FIG. 6 is a matrix, similar to FIG. 4, showing the assembly of FIG. 5 in each selection position thereof.
Figure 7:
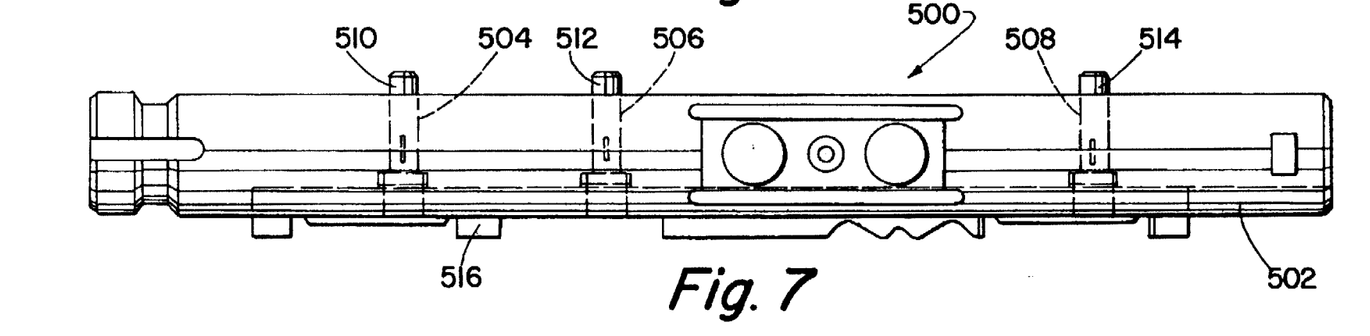
FIG. 7 is a top view of an alternate embodiment of the present invention.
Figure 7A:
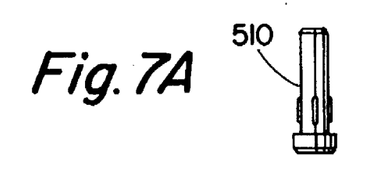
FIG. 7A is a top view of the shift pin used in the assembly of FIG. 7.
Figure 8:
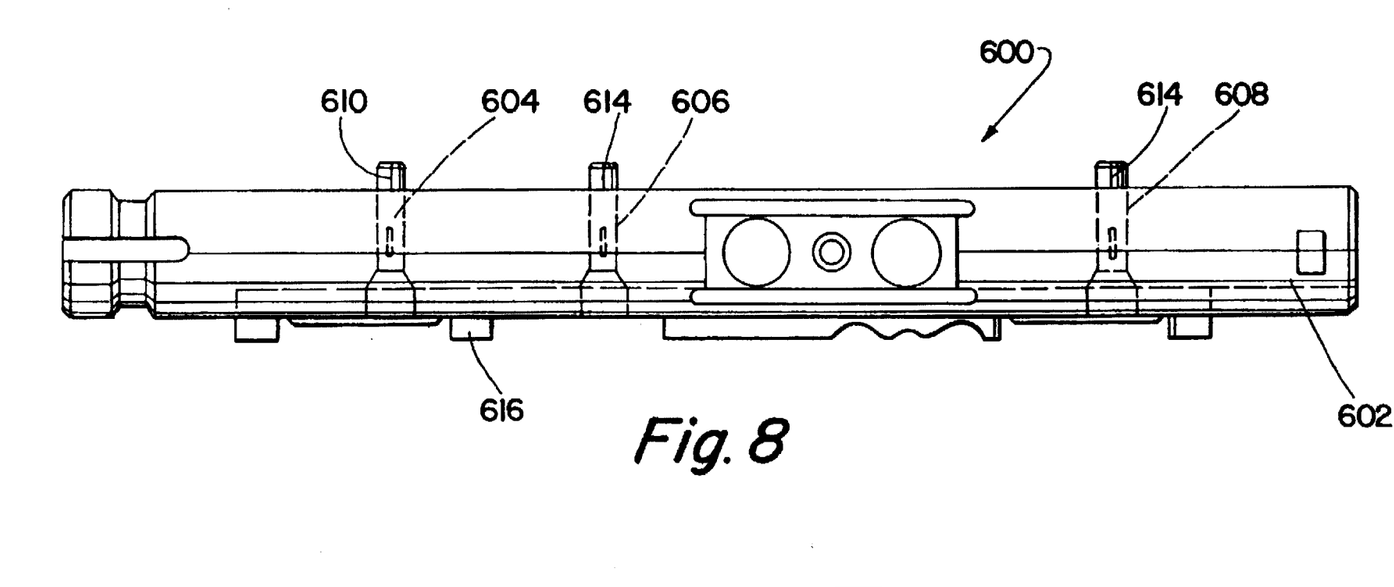
FIG. 8 is a top view of another alternate embodiment of the present invention.
Figure 8A:
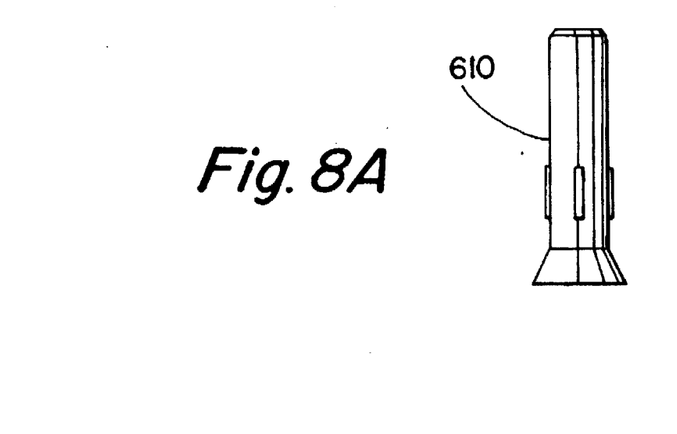
FIG. 8A is a top view of the shift pin used in the assembly of FIG. 8.

FIG. 6 is a matrix, similar to FIG. 4, illustrating the relative positions of the shift pins, interlock key teeth and grooves in hubs 302, 304 and 306 for each selection position of assembly 300.

Figure 5C:
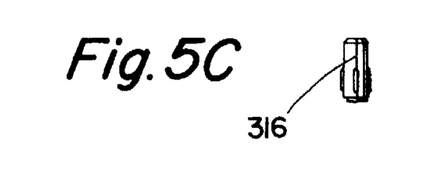
FIG. 5C is a top view of a shift pin used in the assembly of FIG. 5.

FIGS. 7 and 7A and FIGS. 8 and 8A, similar to FIGS. 5B and 5C, illustrate alternate embodiments 500 and 600, respectively, of the present invention. The embodiments 500 and 600 differ from embodiment 300 in that shafts 502 and 602, respectively, utilize radially extending countersunk through bores 504, 506 and 508 and flared through bores 604, 606 and 608, respectively, to receive corresponding headed pins 510, 512 and 514 and 610, 612 and 614, respectively. In both embodiments, the interlock key 516 or 616, respectively, engages the heads of the shift pins to retain the pins in the through bore. The embodiments 500 and 600 are otherwise substantially structurally and functionally identical to embodiment 300.

Figure 10:
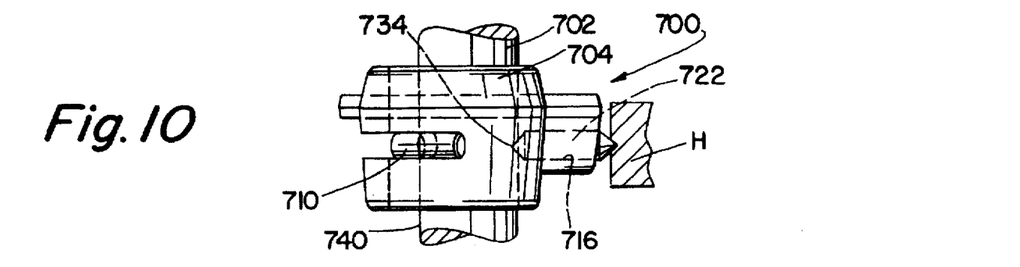
FIG. 10 illustrates an alternate embodiment of the present invention in which pins are utilized to replace the interlock key and the shift key.

FIG. 10 illustrates another alternate embodiment of the present invention, shift shaft and yoke assembly 700. Assembly 700 differs from assembly 300 in that the interlock key and associated keyway are eliminated and replaced by sliding interlock pins slidably received in bores in the yokes and interacting with notches provided in the shift shaft and housing. Sliding pin interlocks are known in the prior art, as may be seen by reference to U.S. Pat. Nos. 4,676,155; 4,974,474 and 4,944,197, the disclosures of which are incorporated herein by reference.

Figure 11:
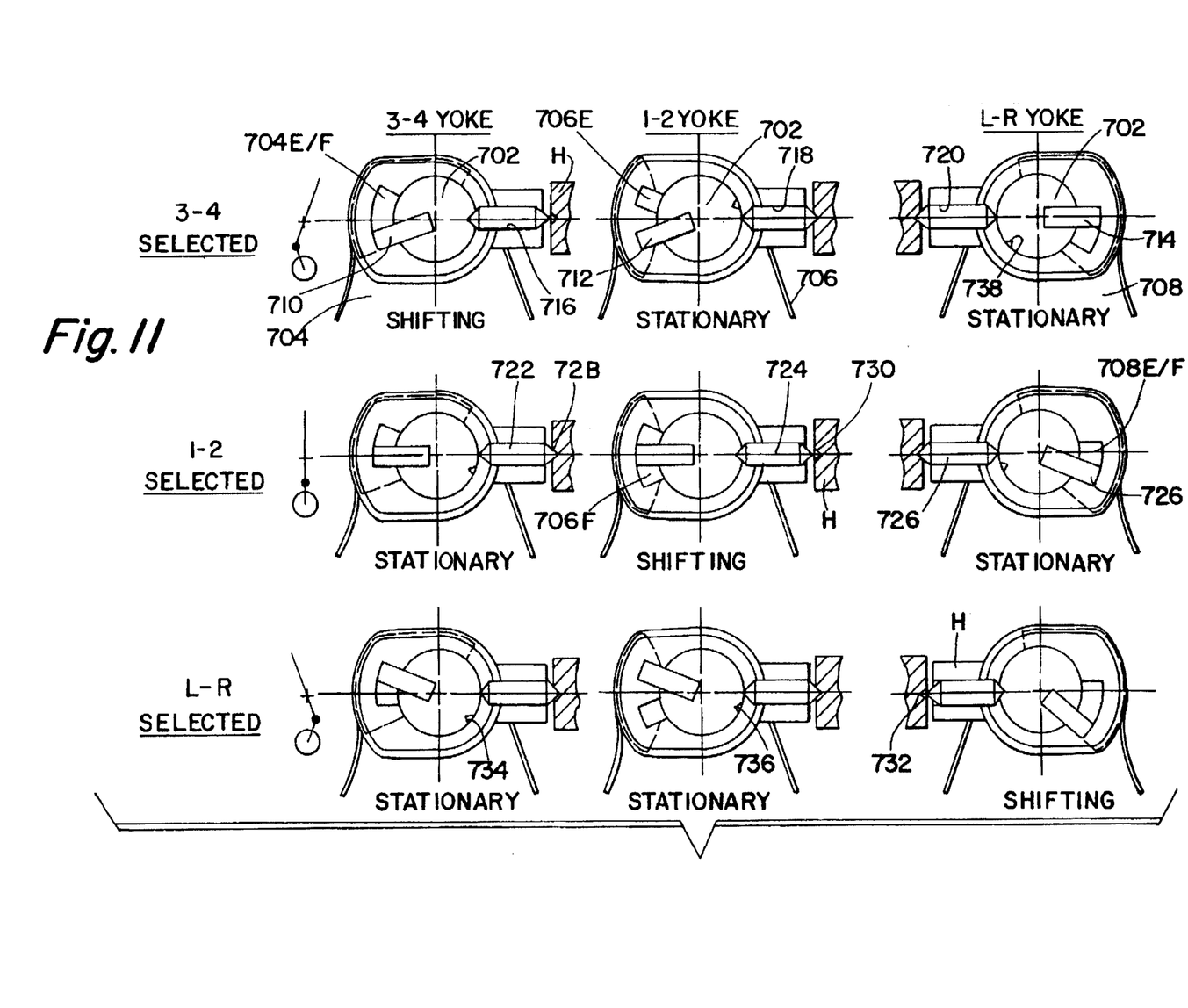
FIG. 11 is a matrix, similar to FIG. 6, of the position of the shaft, shift pins and interlock key of the embodiment of FIG. 10 for each selection position.

The structure and function of embodiment 700 may be seen by reference to FIG. 10 and FIG. 11, which is a matrix similar to FIGS. 4 and 6.

Shift shaft 702 carries the shift yokes 704, 706 and 708 and includes shift pins 710, 712 and 714, which correspond to shift pins 610, 612 and 614, respectively. The shift yokes 704, 706 and 708, respectively, define grooves 704E/F, 706E and 706F and 708E/F, which correspond to grooves 64E/F, 62E and 62F and 60E/F, respectively. The shift pins and shift grooves of embodiments 300, 400, 500, 600 and 700 are functionally identical to the function of the shift key teeth and shift grooves of the prior art embodiment illustrated in FIG. 4.

Each of the yokes 704, 706 and 708 is provided with a generally radially extending bore 716, 718 and 720, respectively, for sliding receipt of an interlock pin 722, 724 and 726, respectively. The housing H is provided with interlock notches or depressions 728, 730 and 732, respectively, aligned with the bores 716, 718 and 720, respectively. The shaft 702 is also provided with interlock notches 734, 736 and 738, only one of which will, for each rotation position of shaft 702, align with one of the bores 716, 718 and 720, respectively.

The interlock pins 722, 724 and 726 are of an axial length such that, if not received in one of the notches 734, 736 or 738, respectively, in the shaft, will be forced by the outer diameter surface 740 of the shaft into housing interlock notches 728, 730 or 732, respectively, to prevent axial movement of the associated yoke relative to housing H. By way of example, referring to FIG. 10A wherein the 3–4 shift yoke 704 is selected, the interlock pin 722 is received in shaft notch 734, allowing yoke 704 to move relative to housing H, while pins 724 and 726 are forced by the outer diameter surface 740 of the shaft 702 into housing interlock notches 730 and 732, locking the 1–2 shift yoke 706 and the L–R shift yoke 708 to the housing.

Figure 12:
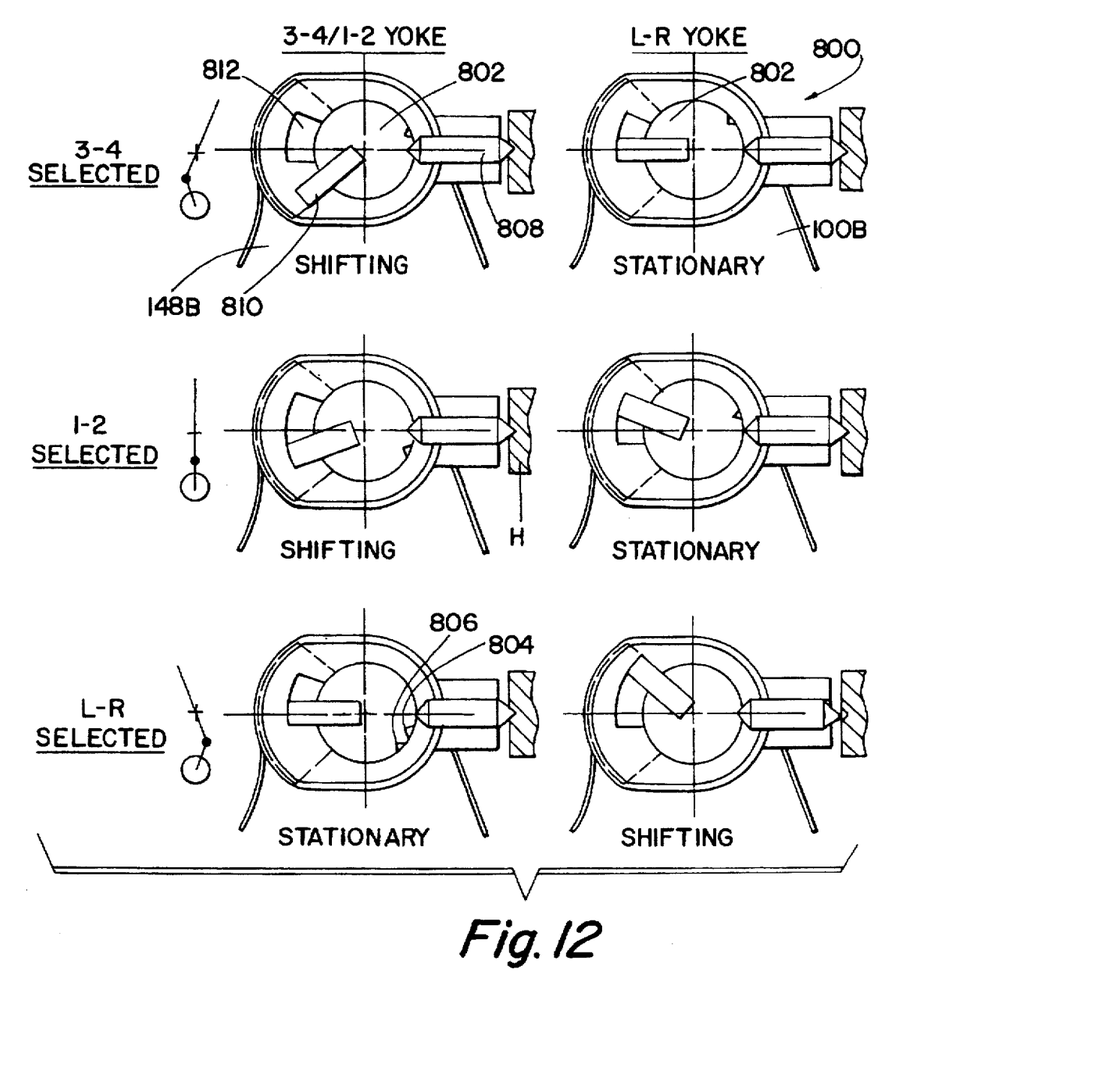
FIG. 12 is a matrix, similar to FIG. 11, for the embodiment of FIG. 10 as utilized with the automatic range-shift transmission of FIGS. 2 and 2A.

A further embodiment of the present invention may be seen in FIG. 12, which also is a matrix similar to FIG. 11. The shift shaft and yoke assembly 800 of FIG. 12 is similar to the embodiment of 700, except that the shift grooves and shaft interlock notches are configured to operate with the "(2+1)×(2)×(2)" 10-speed automatic range transmission 100 of FIGS. 2 and 2A.

The hub 148B of the 3–4/1–2 shift yoke in fork 148A and hub 150B of the L–R shift yoke 150A are carried by shift shaft 802. The shaft is provided with two interlock notches 804 and 806, which will align with the interlock pin 808 carried by hub 148B in two positions, 3–4 selected (top row) or 1–2 selected (middle row), allowing the shift yoke 148A to move relative to the housing H in both positions. Additionally, the shift pin 810 associated with hub 148B will misalign with the shift groove 812 and engage the hub in both the 1–2 and 3–4 selection positions. Otherwise, the structure and function of embodiment 800 is substantially identical to that of embodiment 700.

Accordingly, by the use of pins received in bores (preferably substantially annular pins and bores) to replace keys and keyways, a more economically produced, assembled and/or serviced single shaft shifting mechanism, having a more user friendly shift pattern, is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A single shift shaft mechanism for axially positioning a selected one of two or more selectable engagement members while axially fixing the non-selected ones of said engagement members to a housing, said mechanism comprising a single shift shaft having an outer surface axially and rotationally movable in the housing, shift means axially and rotationally fixed to and extending radially from said outer surface, and interlock means having a first portion rotationally fixed to said shaft and a second portion axially fixed to said housing; said mechanism characterized by:

at least one of said shift means and said interlock means comprising a plurality of individual pins, at least one pin for each engagement member, extending radially outwardly from said outer surface.

2. The mechanism of claim 1 wherein said engagement members are axially movable jaw clutch members.

3. The mechanism of claim 2 wherein each clutch member is associated with a shift yoke having a hub portion with an axially extending through bore receiving said shaft, said interlock means comprising interlock pins axially slidably received in interlock pin bores provided in said hub portions.

4. The mechanism of claim 3 wherein said interlock means first portion fixed to said shaft comprises a shaft depression for receiving one end of said interlock pin, and said interlock means second portion fixed to said housing comprises a housing depression for receiving the other end of said interlock pin, said interlock pin of an axial length greater than the axial length of said interlock pin bores.

5. The mechanism of claim 3 wherein said pins and bores are substantially annular.

6. The mechanism of claim 2 wherein said shifting means are defined by shifting pins received and retained in axially extending bores in said shaft and each clutch member is associated with a shift yoke having a hub portion with an axially extending through bore receiving said shaft, said interlock means comprising interlock pins axially slidably received in interlock pin bores provided in said hub portions.

7. The mechanism of claim 6 wherein said interlock means first portion fixed to said shaft comprises a shaft depression for receiving one end of said interlock pin, and said interlock means second portion fixed to said housing comprises a housing depression for receiving the other end of said interlock pin, said interlock pin of an axial length greater than the axial length of said interlock pin bores.

8. The mechanism of claim 6 wherein said pins and bores are substantially annular.

9. The mechanism of claim 2 wherein said pins are received and retained in radially extending bores in said shaft opening to said outer surface.

10. The mechanism of claim 9 wherein said bores are countersunk through bores and said pins are headed pins.

11. The mechanism of claim 10 wherein said shifting means are defined by said pins and said interlock means are defined by interlock teeth extending from an interlock key axially slidably retained in an axially extending keyway provided in said outer surface, said keyway located circumferentially opposite said openings of said bores.

12. The mechanism of claim 9 wherein said shining means are defined by said pins and said interlock means are defined by interlock teeth extending from an interlock key axially slidably retained in an axially extending keyway provided in said outer surface, said keyway located circumferentially opposite said openings of said bores.

13. The mechanism of claim 12 wherein each clutch member is associated with a shift yoke having a hub portion with an axially extending through bore receiving said shaft, each of said hubs having a transverse slot for receiving one of said pins and for defining opposed strike surfaces for axial engagement thereby.

14. The mechanism of claim 9 wherein said pins and bores are substantially annular.

15. The mechanism of claim 9 wherein said bores are blind bores and said pins are press-fit into said bores.

16. The mechanism of claim 15 wherein said shifting means are defined by said pins and said interlock means are defined by interlock teeth extending from an interlock key axially slidably retained in an axially extending keyway provided in said outer surface, said keyway located circumferentially opposite said openings of said bores.

17. The mechanism of claim 1 wherein said pins are received and retained in radially extending bores in said shaft opening to said outer surface.

18. The mechanism of claim 17 wherein said pins and bores are substantially annular.

19. A single shaft shifting mechanism for selection and engagement of selectable gear ratios in a change speed transmission including a housing, said mechanism comprising a shift shaft mounted for relative axial and rotational movement in said housing and defining an outer surface, a shift block member axially and rotationally connected to said shaft, a plurality of shift forks including sleevelike hub portions having an axially extending through bore and a pair of opposed strike surfaces extending generally perpendicular to the axis of said shaft, a set of shift members projecting radially outwardly from said shaft in an axially-spaced relationship such that each of said hub portions cooperates with a different one of said shift members, said shift members being axially and circumferentially fixed relative to said shaft, a set of interlocking teeth projecting radially from said shaft in an axially-spaced relationship such that each of said hub portions is arranged between two adjacent teeth of said set of interlocking teeth, said set of interlocking teeth being axially movable but circumferentially fixed relative to said shaft and axially fixed relative to said housing, each of said hub portions having at least one pair of axially extending grooves being formed to receive a corresponding one of said shift members and interlocking teeth, said grooves being arranged in predetermined positions along the through bores of said hubs such that when one of said grooves of one of said hubs is aligned with a corresponding one of said interlocking set of teeth, none of the grooves in said hub is aligned with one of said shifting members and one of said grooves of each hub portion other than said one hub portion is aligned with a corresponding one of said shifting members and none of the grooves of each of said hub portions other than said one hub portion is aligned with one of said set of interlocking teeth, said shifting mechanism characterized by:

said shift members comprise generally annular shift pins, at least one for each hub portion, extending radially from said shaft and said interlock teeth are defined by a single interlock key slidably received in an axially extending interlock keyway provided in said shaft.

20. The mechanism of claim 19 wherein said shift pins are received and retained in radially extending bores in said shaft opening to said outer surface.

21. The mechanism of claim 20 wherein said bores are blind bores and said shift pins are press-fit into said bores.

22. The mechanism of claim 20 wherein said bores are countersunk through bores and said shift pins are headed pins.

23. The mechanism of claim 19 wherein each clutch member is associated with a shift yoke having a hub portion with an axially extending through bore receiving said shaft, each of said hubs having a transverse slot for receiving one of said shift pins and for defining opposed strike surfaces for axial engagement thereby.

* * * * *